Jan. 24, 1967   H. L. SHATTO, JR   3,299,950
PIPE LINE CONNECTOR

Filed June 20, 1963   3 Sheets-Sheet 1

INVENTOR:
H. L. SHATTO, JR.
BY: A. H. McCarthy
HIS AGENT

Jan. 24, 1967 H. L. SHATTO, JR 3,299,950
PIPE LINE CONNECTOR

Filed June 20, 1963 3 Sheets-Sheet 2

INVENTOR:
H. L. SHATTO, JR.
BY: *J. H. McCarthy*
HIS AGENT 3,299,950
PIPE LINE CONNECTOR
Howard L. Shatto, Jr., Palos Verdes, Calif., assignor to Shell Oil Company, New York, N.Y., a corporation of Delaware
Filed June 20, 1963, Ser. No. 289,233
8 Claims. (Cl. 166—.5)

This invention relates to operations to be carried out underwater, and pertains more particularly to apparatus for connecting together the ends of two underwater pipe lines or other spaced-apart elements, or for connecting an underwater pipe line to an underwater well installation.

A relative recent development is the drilling of oil and gas wells at offshore locations wherein the wellhead assembly or other associated installation is positioned at a substantial distance below the surface of the water or on the ocean floor. During the drilling and completion of a well of this type, suitable provisions are made for maintaining contact between the vessel on the surface of the water and the underwater wellhead, as by means of a plurality of guide lines or by one or more elongated pipe strings. Using guide lines or a pipe string between the vessel and the ocean floor, the well may be drilled and all the necessary equipment lowered into place on top of the wellhead. When the well has been completed the guide lines extending to the vessel are disconnected from the vessel and either dropped to the ocean floor or secured to a buoy which marks the location of the well.

The use of buoys to mark a well or to support guide lines is not desirable since they constitute a navigation hazard and may break free from the cables. Additionally, the dropping of guide lines to the ocean floor is not too satisfactory since the lines often become entangled and are subject to corrosion. However, it has heretofore been necessary to either mark the location of well guide lines, or to provide a method of re-establishing guide lines between a vessel and a wellhead of the ocean floor in order to carry out certain workover operations of the wellhead. For example, in the event that a break occurs in the pipe line extending along the ocean floor to the wellhead, it is necessary to either repair the damage to pipe line or to disconnect it from the wellhead and to reconnect a new pipe line to the wellhead. Heretofore, this operation of connecting a pipe line to an underwater wellhead has not been possible in waters deeper than a diver can operate unless guide elements are provided between the wellhead and the workover vessel at the surface of the water.

It is therefore a primary object of the present invention to provide apparatus for connecting an underwater pipe line to an underwater wellhead or other underwater installation.

Another object of the present invention is to provide apparatus for connecting together mating ends of a underwater pipe line.

A further object of the present invention is to provide apparatus for positioning underwater two elements in spaced-apart relationship and subsequently bringing them together in connectable engagement.

A further object of the present invention is to provide apparatus for engaging two mating pipe line ends, positioning the two ends in axial spaced relationship one from the other and connecting the two ends together in fixed fluidtight engagement.

These and other objects of this invention will be understood from the following description taken with reference to the drawing, wherein.

Figure 1:
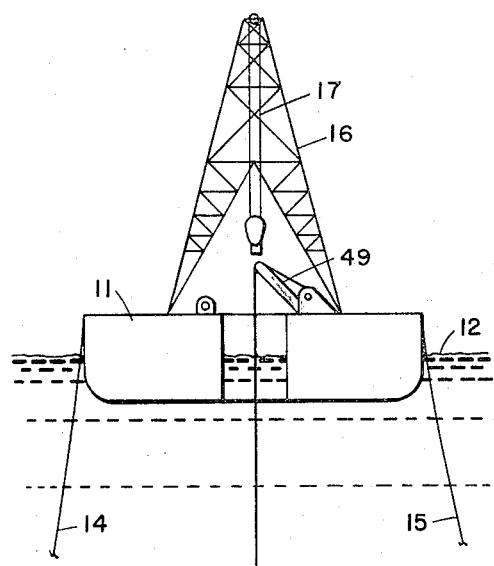
FIGURE 1 is a diagrammatic view illustrating the operation of lowering a cable from a vessel at the surface of the water after the cable has been connected to the lower end of a manipulator device.
Figure 2A:
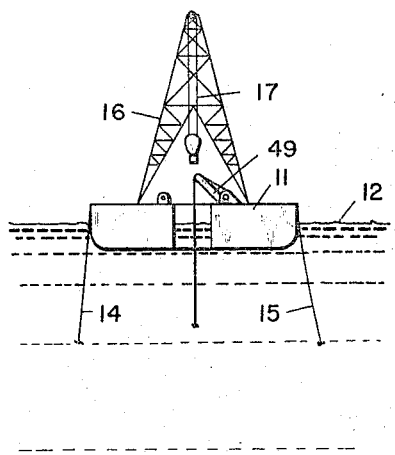
FIGURE 2A is a diagrammatic view illustrating another form of a manipulator device positioned on the ocean floor and arranged for engaging and connecting together two mating ends of a pipe line.
Figure 2A:
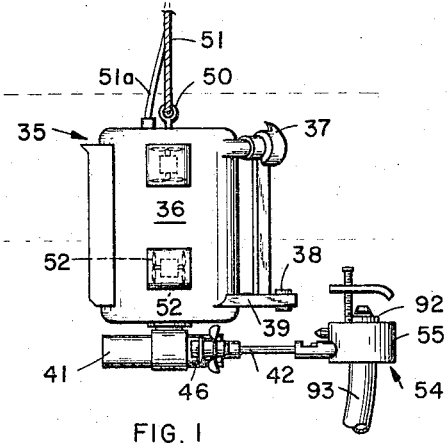
Figure 2A:
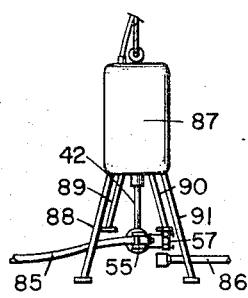
Figure 2:
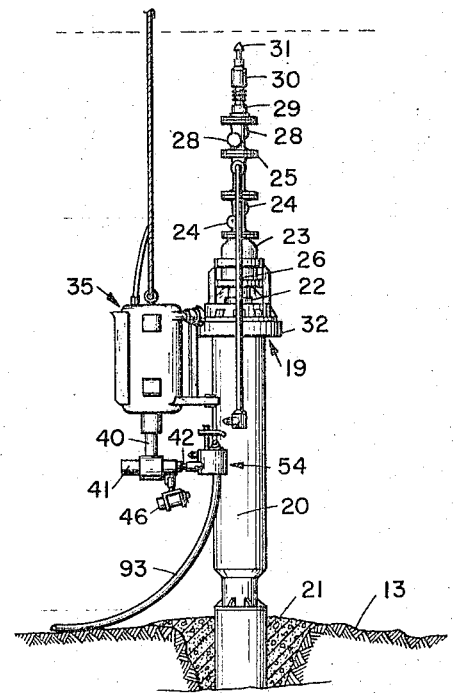
FIGURE 2 is a diagrammtic view illustrating a pipe line section being positioned adjacent an underwater wellhead structure by a lowering and manipulator device which has been positioned on the wellhead device.

Referring to FIGURES 1 and 2 of the drawing, a drilling vessel, platform or barge 11, of any suitable floating or floatable type is illustrated as floating on the surface of the water 12 while being substantially fixedly positioned over a preselected well location by suitable vessel-positioning means well known to the art, or by being anchored to the ocean floor 13 by anchor lines 14 and 15 running to anchors (not shown). Equipment of this type may be used when carrying on well drilling operations or well workover operations in water varying from about 100 feet to 1500 feet or more. The barge or vessel 11 is equipped with a suitable derrick 16 containing a fall line system 17. The vessel 11 is also provided with other auxiliary equipment needed during well operations, such for example as a rotary table positioned on the operating deck, a hinged slip and spider assembly, etc.

The exact position of an underwater well is known on a map and a vessel 11 may be positioned over the wellhead assembly in any suitable manner, as by use of Shoran or other similar position-finding systems well known to the art.

The underwater wellhead structure illustrated in FIGURE 2 is similar to that which is assembled during the drilling and completion of an underwater well in accordance with a present known method. The wellhead assembly 19 includes a large-diameter conductor or foundation pile 20 which is secured in the well by means of cement 21. The upper end of the wellhead assembly has a casinghead 22 closed by a production bonnet 23 on which are mounted master valves 24. A production tee 25 above the master valves 24 is adapted to receive one or more flowlines 26. A swabbing valve 28 is mounted above the production tee 25 and the top of the well is closed by means of a lubricator barrel 29 and a plug 30. The top of the plug 30 is provided with a fishing head 31 by which it may be readily removed.

Fixedly secured to the foundation pile 20 near the top thereof is a track 32 which preferably extends around the foundation pile while being positioned outwardly thereof. As shown in FIGURE 2, the track 32 is adapted to receive and hang therefrom an underwater manipulator device 35 which is self-propelled at least in a horizontal direction and is preferably selectively buoyant.

The manipulator device, generally represented by numeral 35, may be of any suitable type. The manipulator device comprises a body member 36 having means such as wheels 37 for securing it to a wellhead assembly or other underwater assembly, that is, to the track 32 in this particular illustration. The wheels 37 are preferably actuated by motor means operatively connected to the wheels and positioned either inside or outside the body member 36. Additionally, the body member 36 is preferably provided with a pair of idler rollers 38 mounted on an outwardly-extending frame 39 so as to contact the outer surface of the foundation pile 20, as shown in FIGURE 2, when the drive wheels 37 are hung on the track 32. Alternatively, the rollers 38 could be powered to make friction contact with the outer surface of the foundation pile to drive the manipulator device 36 around the wellhead assembly.

A portion of the body member is arranged for downward extension from the body member, preferably in the form of a telescoping arm 40, as shown in FIGURE 2. Mounted at the end of the telescoping arm or body portion 40 is a laterally-extending cylinder 41 having a telescoping arm 42 extendible outwardly therefrom. The arm 42 is provided with a rotatable wrench head 43 (FIGURE 4) that is power-operated by suitable motor means mounted in the arm 42 or in the cylinder 41, preferably in the rear portion thereof. A television camera 45 and suitable lights 46 are mounted adjacent the movable arm 42 of the manipulator device, preferably on a power-actuated light and/or camera swivel and tilting mechanism 47, while a television viewing screen (not shown) is positioned on the vessel 11 at the surface.

The manipulator device 35 may be suspended on a hook or ring 50 having a weight-supporting and current-transmitting cable attached to its upper end. Alternatively, a weight-supporting cable 51 may be secured to the ring 50 while a separate line 51a leads down along the cable 51 into the manipulator housing 36 for supplying current and/or hydraulic pressure fluid thereto. Thus, power for operating the manipulator device and its associated equipment is sent down the cable 51 from the vessel 11 while television signals are returned up the cable to the vessel.

At the same time the manipulator device may be lowered from the vessel 11 by means of the cable 51 and its hoist 49 on the vessel 11 to any selected level in the water. For moving the manipulator device 35 laterally at the end of the cable 51, the manipulator device 35 is provided with suitable propulsion means such, for example, as motor-driven propellers 52 which are mounted outboard of the body member 36 on at least two sides thereof. At least a portion of the body member 36 may form a void chamber which may be selectively flooded by controls at the vessel 11 for adjusting the buoyancy of the manipulator device 35. Vertical position of the manipulator device 35 in the water may be adjusted by other propellers 53, especially if the manipulator device has a slight negative buoyancy. If additional buoyancy is desired, suitable buoyancy tanks may be secured to the weight supporting cable 51.

In order to connect two sections of an underwater pipe line together, the manipulator device is provided with a suitable pair of arms which are movable relative to the body member of the manipulator device 35 and are movable with respect to each other. The movable arms may be secured to the manipulator device in any suitable manner. Thus, in one form of the invention the movable arms may take the form of the pipe line connector generally represented by numeral 54 in the drawings. In the arrangement illustrated the two arms forming the pipe line connector 54 are mounted on the end of the telescoping arm 42 so as to be movable in any direction.

Figure 6:
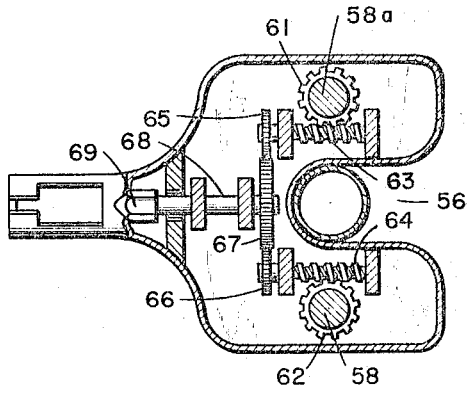
FIGURE 6 is a cross-sectional view taken along the line 6—6 of FIGURE 4.
Figure 5:
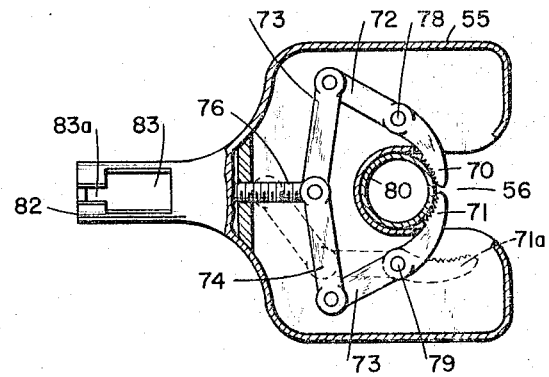
FIGURE 5 is a cross-sectional view taken along the line 5—5 of FIGURE 4.
Figure 7:
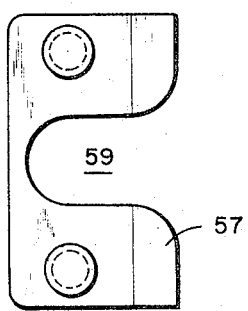
FIGURE 7 is a plan view of the upper pipe engaging element of FIGURE 4.
Figure 4:
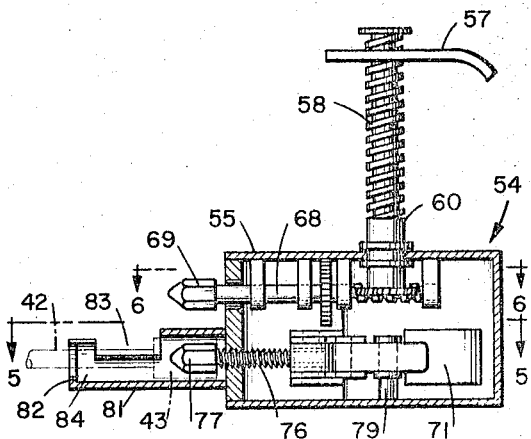
FIGURE 4 is a diagrammatic view taken partially in longitudinal cross-section of the pipe aligning and pipe connecting mechanism carried by the manipulator device of FIGURE 3.
Figure 8:
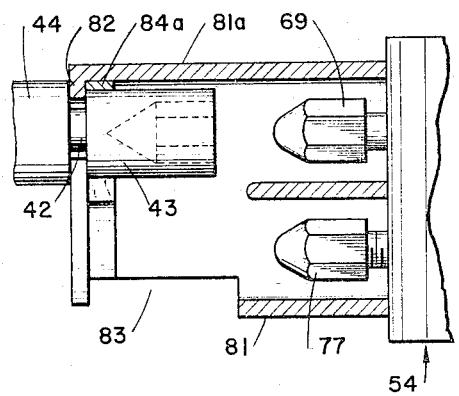
FIGURE 8 is a fragmental view taken in cross section of another form of the support bracket of the present pipe line connector.

As shown in FIGURES 4, 5 and 6 the pipe line connector 54 is provided with a body member 55 having a longitudinal slot 56 extending inwardly from one side thereof. The second movable arm may be in the form of a plate 57 movably mounted on a shaft 58 in fixed spaced relationship from the body member 55 forming the first movable arm. Suitable means are provided for moving the plate arm 57 toward and away from the arm formed by the body member 55. As shown in FIGURE 7, the plate 57 is provided with a slot 59 extending in from one side thereof which slot is adapted to be in alignment with the slot 56 in the housing 55. The slots 56 and 59 have a width equal to at least the outside diameter of the pipe to be positioned therein while being preferably of a width that is slightly less than the outside diameter of any coupling carried on the pipe. Thus, the slots provide pipe engaging means adapted, for example, to be seated below a pipe coupling so as to lift or move the pipe to a desired position.

Any suitable electrical, mechanical or hydraulic actuating means may be employed to move the arm 57 relative to the other arm or body 55. For example, the shaft 58 may be in the form of a lead screw. The shafts or lead screws 58 and 58a extend into the housing 55 through bearing 60 and are provided with gears 61 and 62 mounted within the housing 55 to mesh with actuating screws 63 and 64. The screws 63 and 64 are in turn connected through gears 65, 66 and 67 to a shaft 68 having a wrench head 69 formed at the end thereof. Preferably, as shown in FIGURES 4 and 5, one of the pipe engaging arms is provided with suitable pipe clamping means for fixedly securing a pipe thereto. For example, in FIGURE 5, the body member 55 is provided with a pair of clamping elements or arms 70 and 71 which, through linkage members 72, 73, 74 and 75 are operatively connected to the end of actuating screw 76 which may be provided with a wrench head 77 (FIGURE 4) by which it may be turned. The clamping arms 70 and 71 are mounted on pivot pins 78 and 79 for movement into and out of the slot 56, as illustrated in FIGURE 5, in order to clamp around a section of pipe 80 positioned therein. Thus, it may be seen that when the end of one pipe section is positioned within the slot 59 of one movable arm 57, and the end of another pipe section is positioned in the slot 56 of the other movable arm or body member 55, the two pipe ends may be drawn together into axially aligned engagement.

Suitable means are provided for securing the pipe connector 54 to the manipulator device. In the event that it is desired to leave the pipe line connector 54 on the connected ends of a pipe line, suitable means are employed for removably connecting the housing 55 to the manipulator device, or as in this case, to the wrench head 43 thereof (FIGURE 4).

Fixedly secured to the housing 55 so as to surround at least one of the actuating screw heads 69 or 77 is a locking bracket 81 which may be in the form of a short cylindrical section having an end plate 82 adapted to engage the socket wrench 43 when it is withdrawn to its most retracted position on the telescoping arm 42. A vertical opening 83 is provided in the locking bracket 81 which starts slightly in front of the end plate 82. As shown in FIGURE 5, the opening 83 is slightly longer and wider than the wrench head or socket wrench 43 (FIGURE 4) so that it may be withdrawn from the locking bracket 81. Likewise, the connecting vertical opening 83a adjacent opening 83 is wider than the telescoping arm or shaft 42 secured to the socket wrench head 43 so that the shaft may pass therethrough. Thus, a recessed portion 84 is formed between the end plate 82 (FIGURE 4) and the end of the opening 83, the recess being of a size to accommodate the end of the socket wrench head 43. When the wrench head is positioned in recess and the telescoping arm 42 withdrawn to its most inwardly position, the pipe connecting unit 54 could not be removed from the wrench head 43. If desired, a second locking bracket similar to 81 but turned upside down could be mounted around the wrench head 69 so that its opening would be adjacent opening 83 so that a wrench head could move from one to the other.

A similar form of a pipe connector is illustrated in FIGURE 2A as being connected to a pipe line 85 which is to be positioned in alignment and connected to a pipe line 86 lying on the ocean floor. In this arrangement the manipulator device 87 is provided with fixed or adjustable legs 88, 89, 90 and 91 positioned on the ocean floor so that a downwardly extending telescoping arm 42 may position the pipe engaging arms 55 and 57.

In one method of utilizing the apparatus of the present invention, a pipe line may be connected to an underwater installation in the following manner. With the manipulator device 35 (FIGURE 1) on or at the level of the vessel 11, the coupling 92 at one end of a pipe line 93 would be hung from the pipe engaging arm or body member 55 of the pipe connector 54 and fixedly secured in the slot 56 thereof by clamping the pipe with clamps 70 and 71 against the rear of the slot 56, as illustrated in FIGURE 5. With the end of the pipe 93 fixedly secured within the pipe connector 54 which in turn is secured to the manipulator device 35 through arm 42, the combined apparatus would be lowered by a hoist 95 from the vessel as shown in FIGURE 1 to a position adjacent an underwater wellhead 19 as shown in FIGURE 2. If necessary the propellers 52 may be actuated to drive the manipulator and end of pipe line through the water to a seated position on the circumferential track 32 of the wellhead 19. During the pipe connecting operations observations of the work are carried out by means of the television camera 46.

Figure 3:
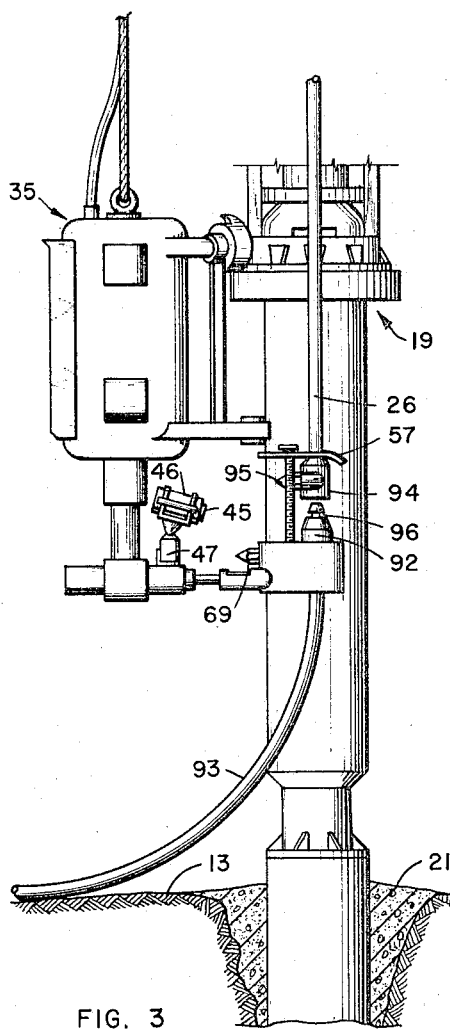
FIGURE 3 is a diagrammatic view illustrating a manipulator device seated on an underwater wellhead while bringing the end of a pipe line into axial alignment with mating end of a pipe line or fitting already secured to the wellhead.

The manipulator device is moved around the track 32 until the pipe line connector 54 is in the vicinity of the well fitting to which the pipe line 93 is to be secured. For purposes of illustration the flowline 26 from the wellhead 19 is shown as being provided at its lower end with a female coupling adapted to meet with the male coupling 92 carried at the end of the pipe line 93. As shown in FIGURE 3 the coupling 94 may be provided with a locking screw having a wrench head 95 adapted to be actuated by the socket wrench of the manipulator device so that the locking screw can be run in and engage a groove 96 formed on the outer surface of the male coupling unit 92.

With the apparatus positioned as shown in FIGURE 2, the telescoping arm 40 is raised upwardly and the telescoping arm 42 is moved outwardly so that the upper pipe engaging arm 57 (FIGURE 7) of the apparatus engages the pipe 26 above its coupling 94 with the pipe 26 being within the slot 59 of the plate or pipe engaging arm 57. With the apparatus positioned as shown in FIGURE 3, the socket wrench 43 (FIGURE 4), is manipulated and moved out of the locking bracket 81 through the opening 83 to engage the wrench head 69 of shaft 68. Rotation of shaft 68 actuates lead screws formed on shafts 58 and 58a so as to hold the plate 57 stationary while the housing member 55 is moved upwardly together with the male coupling 92 of the pipe line 93 until it is in aligned axial engagement with the female coupling 92 at the lower end of pipe line 26.

If it is desired to secure the pipe couplings 92 and 94 together and then remove the pipe aligning and connecting apparatus 54 from the couplings, the socket wrench 43 (FIGURE 4) at the end of the telescoping arm 42 would be moved to the wrench head 95 of the locking screw of coupling 94 (FIGURE 3) so as to run the screw into the locking groove 96 of coupling 92. The socket wrench head 43 of the telescopic arm 42 (FIGURE 4) would then be moved to wrench head 69 so that the telescoping arm 42 could be rotated to actuate shaft 68 so that plate 57 and housing 55 would be forced into spaced relationship as shown in FIGURE 4 by the rotation of the lead screws 58 and 58a. The socket wrench head 43 would then be moved to the head 77 at the end of the actuating screw 76 so as to open the clamping arms 70 and 71 (FIGURE 5). In this case, the clamping arm 71 would move to its retracted position 71a and the other clamping arm 70 would move to a similar position. The telescoping arm 42 would then be pulled to its most retracted position so that the wrench head 43 was in the recess 84 of the locking bracket 81 with the screw head 77 still in the wrench socket. The entire pipe line connector 54 could be then removed and brought back to the vessel by the manipulator device. Under some circumstances, however, it may be desired to leave the pipe line connector in place of the wellhead especially if the coupling 94 does not have a locking screw or other suitable connector means 95.

The pipe line connector of the present invention may be employed in a similar manner as described with regard to FIGURE 2A where it is desired to connect a new section of pipe line 85 to a section of pipe line already on the ocean floor. In this case the new section of pipe line 85 would be connected to one arm 55 of the manipulator device 87 and lowered into place therewith. By moving the other pipe engaging arm 57 of the manipulator device into engagement with the pipe line 86 behind its coupling, the two pipe line sections 85 and 86 could be drawn together and connected. It is to be understood that the manipulator device 87 could also be used in a similar manner for connecting two pipe lines already positioned on the ocean floor. First, one end of a pipe line section would be engaged by one arm of the pipe connector device and then moved into position adjacent the end of the other pipe line which would be engaged by the other arm so that the two pipe line ends could be pulled together in aligned engagement. Additionally, it is to be understood that the reverse operations could be employed in both cases in order to disconnect one section of pipe line from another or from a fitting in an underwater wellhead. While the connecting apparatus has been termed a pipe line connector and has been described with regard to connecting one underwater pipe line to another underwater pipe line or to an underwater installation, it is to be realized that the present apparatus can be employed for connecting other spaced-apart elements which must necessarily be brought into a definite aligned position before one can be connected to the other.

The pipe line connector of the present invention is designed to permit the forcing into engagement of two ends of pipe that have previously been brought close enough together to permit attachment of the pipe line connector device. The connector has enough mechanical advantage to pull the ends together even though considerable force is required. This condition can be arranged at an underwater wellhead or trap farm or other point where connection is required.

The need for great mechanical advantage arises because of the high forces required to force rigid pipes to bend and be moved into engagement so that only a very limited strength of the manipulator's swimmers or even its socket wrench turret head is required. The large force to move the pipe and the reaction to this force are both contained inside the pipe line connector device with the manipulator providing only the strength to lift the coupling device into position onto pipe ends already moved into approximate aligned position by other means.

Figure 10:
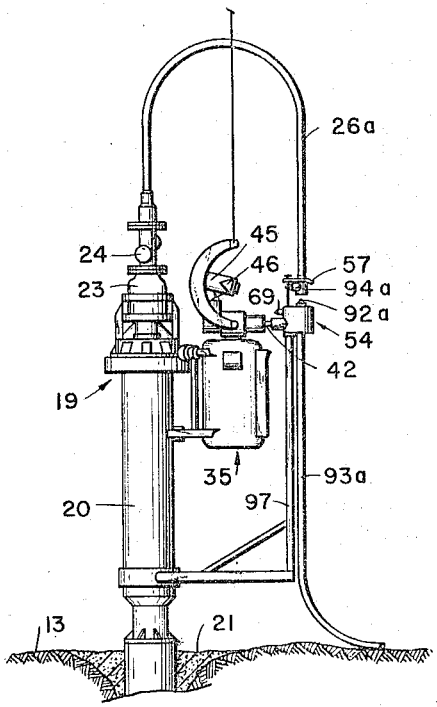
FIGURES 10 and 11 are diagrammatic views illustrating the present pipe line connector being employed to connect pipe lines to an underwater well and an underwater production facility or trap farm, respectively.
Figure 9:
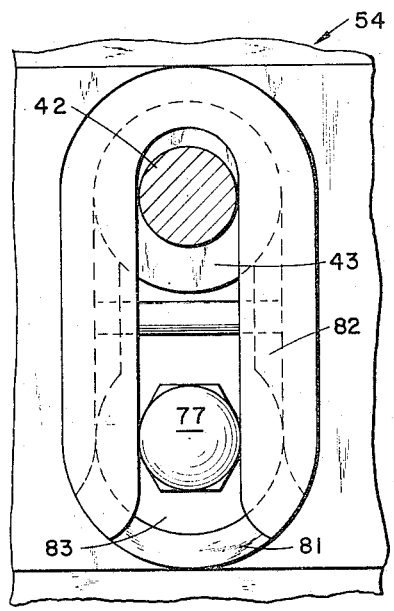
FIGURE 9 is a left-hand view of FIGURE 8.

Thus, in FIGURE 10, the underwater wellhead assembly 19 is provided with a flexible loop flowline 26a which is run down into place (e.g., when the well is closed at the top) so that the flowline coupling 94a is positioned close to and in substantial alignment with a mating coupling 92a on the end of a pipe line which has been previously installed and rigidly secured to an arm 97 extending vertically a distance outboard of the wellhead so that the manipulator 35 can move around the wellhead. Thus, the manipulator can carry the pipe line connector 54 down into place and connect it to the two couplings 92a and 94a after which wrench head would be moved to nut 69, to actuate it and pull the couplings together. If desired, the connector 54 could be left in place.

Figure 11:
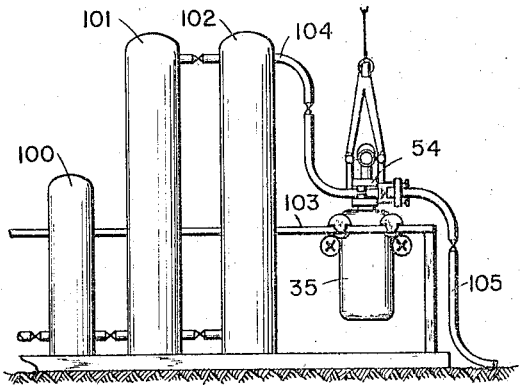

In FIGURE 11, the apparatus of the present invention is shown as being used to connected together two sections of an underwater pipe line at an underwater production facility or trap farm. The production facility may comprise any suitable equipment well known to the art for metering, separating, storing, or merely manifolding oil or gas field production. Thus, a series of tanks 100, 101 and 102 are illustrated as being arranged in a line with a manipulator track 103 running along at least one side for receiving a manipulator 35 thereon. The manipulator 35 is provided with the pipe line connector 54 of the present invention for connecting together the mating ends of two pipes 104 and 105.

I claim as my invention:

1. Pipe aligning and connecting apparatus for use with a manipulator device having prime mover means with a power connection extending therefrom, said apparatus comprising:
   (a) a body member adapted to be secured to a manipulator device for movement therewith;
   (b) first and second pipe-engaging arm means axially spaced along a substantially common axis and carried by said body member for separately engaging pipe sections to be connected to each other, at least one of said arm means being movable toward the other of said arm means along said axis when both are in pipe-engaging position; and,
   (c) arm-actuating means carried by said body member and operatively engaging said movable arm means, said arm-actuating means adapted to be independently operatively connected to said power connection of said prime mover means of said manipulator device.

2. The apparatus of claim 1 wherein said arm-actuating means includes gear means engaging said movable arm means for moving it relative to said other arm means.

3. The apparatus of claim 2 wherein said gear means of said pipe-engaging arm includes an outwardly-extending actuating shaft provided with a wrench head.

4. The apparatus of claim 1 wherein said first and second pipe-engaging arm means comprise a pair of parallel spaced-apart plate means having aligned pipe openings extending in from one edge, said openings being of a size to receive a pipe therein.

5. The apparatus of claim 4 wherein the pipe openings are of a size slightly greater than the outer diameter of a pipe to be received therein while being smaller than the outer diameter of a coupling on said pipe.

6. The apparatus of claim 1 including cooperating connector means carried by said body member and said manipulator device whereby said body member may be removably connected to said manipulator device.

7. The apparatus of claim 4 including pipe-clamping means carried by at least one of said pipe-engaging arms for holding a pipe in said pipe opening.

8. The apparatus of claim 7 wherein said pipe-clamping means includes independent actuator means adapted to be energized by said prime mover means of said manipulator device.

References Cited by the Examiner

UNITED STATES PATENTS

| | | | |
|---|---|---|---|
| 2,450,934 | 10/1948 | Calhoun | 175—85 X |
| 3,095,048 | 6/1963 | O'Neill et al. | 175—85 X |
| 3,158,212 | 11/1964 | Fanshawee et al. | 175—85 |
| 3,165,899 | 1/1965 | Shatto | 166—.6 X |
| 3,166,123 | 1/1965 | Watkins | 166—.6 |
| 3,220,245 | 11/1965 | Van Winkle | 166—.6 |

CHARLES E. O'CONNELL, *Primary Examiner.*

R. E. FAVREAU, *Assistant Examiner.*